United States Patent
Purdy et al.

(10) Patent No.: US 11,945,997 B2
(45) Date of Patent: Apr. 2, 2024

(54) COMPOSITION USEFUL IN SULFATE SCALE REMOVAL

(71) Applicant: Fluid Energy Group Ltd, Calgary (CA)

(72) Inventors: Clay Purdy, Medicine Hat (CA); Markus Weissenberger, Calgary (CA); Stig Magnor Nordaa, Sandnes (NO); Adrienne Lee, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 86 days.

(21) Appl. No.: 16/823,025

(22) Filed: Mar. 18, 2020

(65) Prior Publication Data
US 2020/0308472 A1 Oct. 1, 2020

(30) Foreign Application Priority Data
Apr. 1, 2019 (CA) .................. CA 3038556

(51) Int. Cl.
| | |
|---|---|
| *C02F 5/08* | (2023.01) |
| *C02F 5/10* | (2023.01) |
| *C02F 5/12* | (2023.01) |
| *C09K 8/528* | (2006.01) |
| *C02F 101/10* | (2006.01) |
| *C02F 103/08* | (2006.01) |
| *C02F 103/10* | (2006.01) |
| *E21B 37/06* | (2006.01) |

(52) U.S. Cl.
CPC .............. *C09K 8/528* (2013.01); *C02F 5/125* (2013.01); *C02F 2101/101* (2013.01); *C02F 2103/08* (2013.01); *C02F 2103/10* (2013.01); *E21B 37/06* (2013.01)

(58) Field of Classification Search
CPC ... C09K 8/52; C09K 8/528; C02F 5/08; C02F 5/105; C02F 2101/32
See application file for complete search history.

(56) References Cited

U.S. PATENT DOCUMENTS

| | | | |
|---|---|---|---|
| 3,625,761 A | 12/1971 | Tate et al. | |
| 4,030,548 A | 6/1977 | Richardson et al. | |
| 4,708,805 A * | 11/1987 | D'Muhala ................ | C02F 5/12 210/698 |
| 4,980,077 A | 12/1990 | Morris et al. | |
| 5,084,105 A | 1/1992 | Morris et al. | |
| 7,470,330 B2 | 12/2008 | Keatch | |
| 2006/0166838 A1* | 7/2006 | Collins .................... | C09K 8/92 507/219 |
| 2007/0221246 A1* | 9/2007 | Keatch .................... | C02F 5/125 134/3 |
| 2015/0141302 A1* | 5/2015 | Nasr-El-Din ............ | C09K 8/82 507/241 |
| 2018/0037805 A1* | 2/2018 | Utschig-Samuels ..... | C11D 3/30 |

FOREIGN PATENT DOCUMENTS

WO 1993024199 A1 12/1993

* cited by examiner

*Primary Examiner* — Haidung D Nguyen
(74) *Attorney, Agent, or Firm* — Berg Hill Greenleaf Ruscitti LLP

(57) ABSTRACT

The present invention discloses a novel aqueous composition for use in removing petroleum-contaminated barium sulfate scale from a surface contaminated with such, said composition comprising: a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; a scale removal enhancer; and a non-ionic surfactant. There is also disclosed methods to use such compositions.

12 Claims, 1 Drawing Sheet

COMPOSITION USEFUL IN SULFATE SCALE REMOVAL

CROSS REFERENCE TO RELATED APPLICATIONS

This application claims priority to Canadian Patent Application No. 3,038,556, filed Apr. 1, 2019, the entirety of the related application being incorporated herein by reference.

FIELD OF THE INVENTION

The present invention is directed to a composition for use in oilfield operations, more specifically to compositions used in the removal of petroleum-contaminated barium sulfate scale.

BACKGROUND OF THE INVENTION

Scaling, or the formation of mineral deposits can occur on surfaces of metal, rock, or other materials. Scale is caused by a precipitation process as a result of a change in pressure and temperature and the subsequent change in the composition of a solution (commonly water).

Typical scales consist of e.g. calcium carbonate, calcium sulfate, barium sulfate, strontium sulfate, iron sulfide, iron oxides, or iron carbonate.

In some cases, scale deposits restrict or even shut-off the production conduit if the produced water composition flow path is severely affected by a change in pressure and/or temperature due to wellbore equipment, such as downhole chokes or flow-controls. In addition to produced formation water scaling issues due to the mineral content, also other sourced water utilized in well operations can be potential sources of scaling minerals, including water used in water flood operations or geothermal operations and associated equipment.

The precipitation of sulfate scales can occur at any point in a production, injection, or disposal well cycle, and can also be caused by incompatibilities of injected water and formation water, in addition to the changes in temperature and pressures mentioned above, as well as wellbore additives or upsets in the flow equilibrium. Scale on surface equipment (e.g. heat exchangers, piping, valves, flow-control devices) are also a catalyst for sulfate scales. In offshore oil & gas operations, seawater is often injected into reservoirs for pressure maintenance, and as seawater has a high content of sulfate ions and formation water or drilling fluids often have a high content of barium, calcium, and/or strontium ions stripped from the formation, mixing these waters causes sulfate mineral precipitation. Sulfate scaling on surface equipment, such as heat exchangers and the associated piping, is a major issue for industry as well as it typically needs to be managed by mechanical means such as disassembling the equipment in question, manually cleaning the scale and reassembling which is very time consuming and expensive. Having a chemical solution that can treat these sulfate scales with minimal agitation and at lower temperatures would be very advantageous for industry. As the multiple sulfate composition scaling challenges occur offshore—onshore are typically very difficult to manage efficiently as a whole. Having a sulfate dissolver that solubilizes all typical scales encountered either individually or as a composition is advantageous for the industry versus having to deploy specific chemistry for each type of scale or manage the scaling issues with mechanical means.

The most obvious way of preventing a scale from forming during production is to prevent the creation of super saturation of the brine being handled and manage the flow path of fluids to minimize pressure and rate differentials. This may sometimes be possible by altering the operating conditions of the reservoir, for example by ensuring that the wellbore pressure is sufficient to prevent the liberation of gas and by injecting water which is compatible with formation water. However, economics usually dictate that the use of inhibitors or treating any precipitated scale is preferred to manage costs.

Controlling scale with the use of inhibitors as well as understanding and mitigating scaling tendencies is important for both production and injection wells, but so is having a solution or economical means of treating any scaling that does occur, even after best practices have been implemented during the production cycle.

The design of scale treatment programs requires extensive knowledge of scaling/chemistry theory and a broad base of practical operational experience to be successful. Applications occasionally present themselves in which the ideal selection of chemicals and fluids may be beyond the scope of a wellsite engineer's experience or theoretical knowledge. Rules of thumb and general formulas may not be adequate, and selection procedures based on broader experience and more in-depth knowledge may be required. Analysis of deposits and dissolver screening ideally should be performed when considering a potential scale dissolving application, therefore the scale that is causing the "problems" will have to be analyzed.

The most common sulfate scales are barium, calcium, and strontium. These alkaline earth metal salts have many similar properties and often precipitate together forming problematic sulfate scales. The deposition of this scale is a serious problem for oil and gas producers globally, causing fouling in the wellbore and surface related processing equipment. These scales not only restrict the hydrocarbon flow from the formation resulting in lost production, and since the formation or injection water is saturated with sulfates, the continued deposition causes fouling and potentially failures of critical equipment such as perforations, casing, tubes, valves, and surface equipment, all with the potential to reduce the rate of oil production and result in substantial lost revenue. There is a need in industry for an effective solution to this ongoing challenge. Sulfate scales such as radium sulfate, barium sulfate, calcium sulfate etc.—are sometimes referred to as NORM scale due to their solubility characteristics—typically 0.0023 g/l in water—are more difficult to deal with than carbonate scales. Sulfate scales are not soluble in traditional acid scale dissolvers. Radium sulfate, while not being the most common sulfate scale represents a challenge in its removal as it is often imbedded in barium sulfate scale and is also radioactive and thus can carry an exposure risk and cause very expensive clean-up or disposal costs of tubing and down-hole equipment etc. when brought out of the well for replacement, general service or abandonment. Having a chemical that can be used to wash these components while still in the well and effectively clean/remove the NORM materials leaving them down-hole, allowing the operator to greatly reduce handling/disposal costs related to NORM containing wells is very advantageous.

Once this water insoluble scale has formed, it is extremely difficult to remove with existing chemical options on the market.

The solubility of barium sulfate is reported to be approximately 0.0002448 g/100 ml (20° C.) and 0.000285 g/100 ml (30° C.). Existing methods to remove sulfate scale include mechanical removal and/or low performance scale dissolvers currently on the market, but both have limitations and disadvantages. Mechanical removal involves the use of milling tools, scraping, or high-pressure jetting, and/or disassembly of key production equipment causing substantial down time of production and processing equipment. These methods have limited efficiency as the scale is extremely hard to remove, often forming in areas beyond the reach of the mechanical equipment as many facilities have welded joints and limited access. High pressure jetting will typically only remove the surface of the scale.

Sulfate scale dissolvers were developed to overcome the low solubility of these types of scale. Sulfate scale dissolvers work by chelating/mopping up the dissolved sulfate that is present in the water allowing more to be dissolved. To assist the rate of reaction/increase the speed and efficiency of dissolution, these products are typically deployed at elevated temperatures of 50° C. to 90° C. Sulfate scale dissolution will as a result take far longer than for example carbonate scale dissolution utilized in and acid. Typical scale dissolvers such as ethylenediaminetetraacetic acid (EDTA), and variations of this molecule (such as DTPA) are used by the industry to dissolve sulfate scale with some success, and sequestering the barium, calcium, and strontium ions. However, this process is time consuming, requires higher temperatures (usually above 75° C.), and has limited dissolution capacity.

The following include some patent disclosures of sulfates scale removers. U.S. Pat. No. 4,980,077 A demonstrates that alkaline earth metal scales, especially barium sulfate scale deposits can be removed from oilfield pipe and other tubular goods with a scale-removing composition comprising an aqueous alkaline solution having a pH of 8 to 14, a polyaminopolycarboxylic acid, preferably EDTA or DTPA, and a catalyst or synergist comprising an oxalate anion. It is stated that when the scale-removing solution contacts a surface containing a scale deposit, substantially more scale is dissolved at a faster rate than previously possible.

WO 1993024199 A1 demonstrates the use of low frequency sonic energy in the sonic frequency range to enhance the dissolution of alkaline earth metal scales using a scale-removing solvent comprising an aqueous alkaline solution having a pH of 8 to 14 and containing EDTA or DTPA and a catalyst or synergist, preferably an oxalate anion. It is stated that when the scale-removing solvent contacts a surface containing a scale deposit while simultaneously transmitting low frequency sonic energy through the solvent, substantially more scale is dissolved at a faster rate than previously possible.

U.S. Pat. No. 4,030,548A demonstrates a barium sulfate scale (or solid) can be dissolved economically by flowing a stream of relatively dilute aqueous solution of aminopolyacetic acid salt chelating agent into contact with and along the surfaces of the scale while correlating the composition and flow rate of the solution so that each portion of solution contains an amount of chelant effective for dissolving barium sulfate and the upstream portions of the scale are contacted by portions of the solution which are unsaturated regarding the barium-chelant complex.

U.S. Pat. No. 3,625,761A demonstrates a method of removing a deposit of alkaline earth metal sulfate scale in an aqueous system which comprises contacting said scale deposit with a treating composition heated to a temperature in the range of 86 to 194° F. consisting essentially of an aqueous alkaline solution containing 4 to 8 percent by weight of disodium hydrogen ethylenediaminetetraacetate dihydrate and having a pH in the range of 10 to 13 for a period sufficient to dissolve at least some of the said scale, acidifying said solution to decrease the pH thereof to a pH in the range of 7 to 8 with an acid selected from the group consisting of sulfuric acid, hydrochloric acid, oxalic acid, a mixture of sulfuric acid and oxalic acid, and a mixture of hydrochloric acid and oxalic acid, to precipitate any alkaline earth metal ion present.

U.S. Pat. No. 5,084,105A demonstrates that alkaline earth metal scales, especially barium sulfate scale deposits can be removed from oilfield pipe and other tubular goods with a scale-removing composition comprising an aqueous alkaline solution having a pH of 8 to 14, preferably 11 to 13, of a polyaminopolycarboxylic acid, preferably EDTA or DTPA and a catalyst or synergist comprising a monocarboxylic acid, preferably a substituted acetic acid such as mercaptoacetic, hydroxyacetic acid or aminoacetic acid or an aromatic acid such as salicylic acid. The description states that when the scale-removing solution is contacted with a surface containing a scale deposit, substantially more scale is dissolved at a faster rate than is possible without the synergist.

U.S. Pat. No. 7,470,330 B2 demonstrates a method of removing metal scale from surfaces that includes contacting the surfaces with first an aqueous solution of a chelating agent, allowing the chelating agent to dissolve the metal scale, acidifying the solution to form a precipitant of the chelating agent and a precipitant of the metal from the metal scale, isolating the precipitant of the chelating agent and the precipitant of the metal from the first solution, selectively dissolving the precipitated chelating agent in a second aqueous solution, and removing the precipitated metal from the second solution is disclosed. This is understood to be a multi-step process which would cause longer shutdown in production and is not determined to actually be applicable in the field.

Crude oil or petroleum is generally identified by the content of various hydrocarbons therein. The first class of compounds making up petroleum are paraffins. These are the most common hydrocarbons in crude oil. The second class of compounds making up petroleum are naphthenes. The third class of compounds making up petroleum are aromatics but these represent only a small percentage of the total petroleum extracted. During production, the accumulation of barium scale within tubing where petroleum flows will restrict the flow and may, if unchecked, completely block the flow. The removal of barium sulfate scale, as discussed above, requires shut down of oil production and depending on the situation may take several hours to several days to re-establish sufficient flow to re-start production.

Despite the existing prior art, there are very few commercial compositions available to remove barium sulfate scale, the situation is made even more complex since most barium sulfate scale occurs in wellbores, pipes and other equipment associated with either oil production and/or oil exploration. Thus, the removal of petroleum-contaminated barium sulfate scales presents an even more challenging task for oilfield operators.

When the sulfate scale is co-mingled/coated/covered with a petroleum-based product, it is understood to be contaminated by such. Petroleum contamination makes the scale surface hydrophobic and therefore the common aqueous descaling/chelating compositions have substantially more difficulty interacting with the barium sulfate scale through this barrier. Consequently, this petroleum contamination dramatically reduces the efficiency of the scale dissolver.

There thus exists a profound need for compositions and methods capable of removing very difficult to remove petroleum-contaminated barium sulfate scales present in oilfield operations.

SUMMARY OF THE INVENTION

According to the first aspect of the present invention, there is provided an aqueous composition for use in removing petroleum-contaminated barium sulfate scale from a surface contaminated with such, said composition comprising:
a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
a scale removal enhancer; and
a non-ionic surfactant.

Preferably, the scale removal enhancer is selected from the group consisting of: potassium carbonate; potassium formate; cesium carbonate; cesium formate; and combinations thereof. Preferably also, the scale removal enhancer is present in the composition in an amount ranging from 5 to 20 wt % of the composition. More preferably, the scale removal enhancer is present in the composition in an amount ranging from 10 to 15 wt % of the composition. Even more preferably, the scale removal enhancer is present in the composition in an amount of approximately 10 wt % of the composition.

According to another aspect of the present invention, there is provided a method of removing petroleum-contaminated barium sulfate scale, said method comprising the steps of:
providing a liquid composition comprising:
a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
a scale removal enhancer; and
a non-ionic surfactant;
exposing a surface contaminated with barium sulfate scale to the liquid composition;
allowing sufficient time of exposure to remove the petroleum-contaminated barium sulfate scale from the contaminated surface.

According to another aspect of the present invention, there is provided an aqueous composition for use in removing petroleum-contaminated barium sulfate scale from a surface contaminated with such, said composition comprising:
a chelating agent and a counterion component selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$; and
a scale removal enhancer; and
a non-ionic surfactant.

Preferably, the scale removal enhancer is selected from the group consisting of: potassium carbonate; potassium formate; cesium formate; cesium carbonate, and combinations thereof. Preferably, the scale removal enhancer is present in the composition in an amount ranging from 5 to 20 wt % of the composition. More preferably, from 10 to 15 wt % of the composition. Also preferably, the scale removal enhancer is present in the composition in an amount of approximately 10 wt % of the composition.

Preferably, the chelating agent and counterion are present in the composition in an amount ranging from 5 to 40 wt % of the composition. More preferably, from 10 to 30 wt % of the composition. Also preferably, the chelating agent and counterion are present in the composition in an amount ranging from 10 to 20 wt % of the composition.

According to the preferred embodiment of the present invention, the concentration of the surfactant ranges between 0.1 wt % to 3.0 wt %. Preferably, the concentration of the surfactant does not exceed 2 wt % as it is progressively more difficult to dissolve such at a basic pH. Preferably, the pH of the composition ranges from 10 to 11.

BRIEF DESCRIPTION OF THE FIGURES

Features and advantages of embodiments of the present application will become apparent from the following detailed description and the appended figures, in which.

DETAILED DESCRIPTION OF A PREFERRED EMBODIMENT

Figure 1:
FIG. 1 is a picture showing the solubilization of barium sulfate scale covered in 40% crude oil in a solution of a known barium sulfate scale dissolver at 20° C. after 4 hours of exposure.
Figure 2:
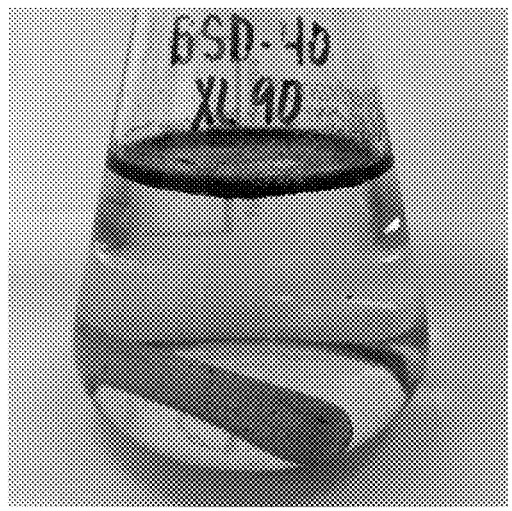
FIG. 2 is a picture showing the solubilization of barium sulfate scale covered in 40% crude oil in a solution of a barium sulfate scale dissolver according to a preferred embodiment of the present invention at 20° C. after 4 hours of exposure.
Figure 3:
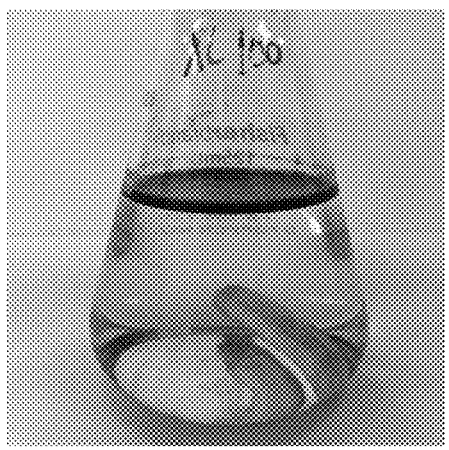
FIG. 3 is a picture showing the solubilization of barium sulfate scale covered in 40% crude oil in a solution of a barium sulfate scale dissolver according to another preferred embodiment of the present invention at 20° C. after 4 hours of exposure.
Figure 4:
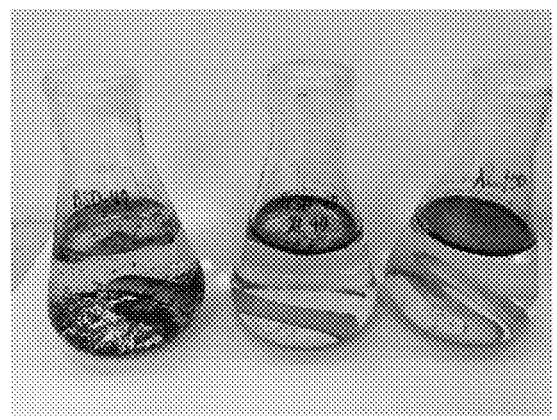
FIG. 4 is a picture showing the side-by-side solubilization of barium sulfate scale covered in 40% crude oil in a solution of the three barium sulfate scale dissolvers tested (as per FIG. 1, FIG. 2, and FIG. 3).

By the addition of potassium carbonate to $K_5DTPA$, the same solubility numbers can be attained at a lower pH. Instead of 13.5, a pH of 11 was sufficient to obtain comparable solubility numbers. This represents a considerable difference. This allows to conduct scale removal operations at a lower pH and therefore increases the safety for the personnel handling the remover or anyone in the surrounding area.

According to a preferred embodiment of the present invention, the petroleum-contaminated barium sulfate scale removing composition provides improved rates of scale dissolution. This, in turn, reduces the down time for wells where the scale is being removed. It also reduces the cost of such treatment by limiting the treatment time.

As shown, the compositions tested for removing non-contaminated barium sulfate scale permits the removal thereof at a much lower pH than what has been practiced to date. Indeed, such a composition can effectively remove barium scale under conditions where the pH is 11, rather than other scale removal compositions which require conditions where the pH is 13. A preferred composition according to the present invention may remove up to 30 kg/m³ of non-contaminated $BaSO_4$ scale with a pH of 10. When using the term "non-contaminated $BaSO_4$ scale", it should be understood to the person skilled in the art, that the barium sulfate scale is not contaminated by petroleum product or a petroleum-based product.

According to a preferred embodiment of the present invention, a composition for removing petroleum-contaminated barium sulfate scale permits the removal thereof with a higher dissolution capacity. This, in turn, allows reducing the volume of scale remover necessary. This also decreases transport costs and many other related items resulting from the usage of lower volumes of scale remover.

According to a preferred embodiment of the present invention, a composition for removing petroleum-contaminated barium sulfate scale permits the removal thereof at lower temperature than other barium sulfate scale removing treatments. This results in safer treatment conditions for individuals involved in this process.

According to a preferred embodiment of the present invention, a composition for removing petroleum-contaminated barium sulfate scale comprises a non-ionic surfactant. Alcohol ethoxylate-based surfactants are preferably used in the present invention because of their non-ionic character. However, because of this non-ionic character, long ethoxylate chains are necessary to make them water-soluble at a pH of 10 to 11. Examples of alcohol ethoxylate-based surfactant include, but are not limited to: aromatic ethoxylates and branched or linear ethoxylates of the following formula: $H_3C-(CH_2)_m-(OC_2H_4)_nOH$ where m is between 6 and 12 and n is between 8 and 16, preferably m is 9 and n is between 9 to 14.

To prepare the base BSD solution, combine 334 g of distilled water with 300 g of potassium hydroxide (40% (w/v)) solution and 197 g of diethylenetriamine pentaacetate. Mix thoroughly. Measure 500 mL of the base solution and add 500 mL of distilled water with 50 g of potassium carbonate and 4 mL of XL 90. Mix thoroughly.

Lutensol® surfactants are ethoxylates of alkyl polyethylene glycol ethers based on the C10-Guerbet alcohol. They are non-ionic surfactants. The Lutensol®XL BASF $C_{10}$-Guerbet Alcohol used for the experiments can be better described as follows: the chemical formula is $C_5H_{11}CH(C_3H_7)CH_2OH$ with the restriction that for 70-99 weight % of compound $C_5H_{11}$ means n-$C_5H_{11}$ and for 1-30 weight % $C_5H_{11}$ means $C_2H_5(CH_3)CH_2$ and/or $CH_3CH(CH_3)CH_2CH_2$. Produced by BASF via dimerization of slightly branched C5-aldehyde via aldol reaction followed by hydrogenation. The various surfactant tested in this description are listed and characterized in Table 1 below.

TABLE 1

Characterization of the various surfactants used in the contaminated barium sulfate scale dissolution tests

|  | Lutensol ® XL 90 | Lutensol ® XL 100 | Lutensol ® XL 140 |
|---|---|---|---|
| C-Chain | $C_{10}$-Guerbet | $C_{10}$-Guerbet | $C_{10}$-Guerbet |
| Degree of ethoxylation | 9 | 10 | 14 |
| HLB number | 14 | 14.5 | 16 |

The content of the compositions according to preferred embodiments of the present invention are listed in Table 2 below. The method of preparing such compositions requiring the initial preparation of the barium sulfate scale dissolver (referred to base BSD) which is then admixed with the appropriate surfactant as per the compositions listed in Table 2.

TABLE 2

Preferred Compositions according to the present invention

| Base BSD with XL 90 | Base BSD with XL 100 | Base BSD with XL 140 |
|---|---|---|
| 100 mL of base BSD with 0.4% XL 90 Or 100 mL of base BSD with 400 µL XL 90 | 100 mL of base BSD with 0.4% XL 100 or 100 mL of base BSD with 400 µL XL 100 | 100 mL of base BSD with 0.4% XL 140 or 100 mL of base BSD with 400 µL XL 140 |

The hydrophilic-lipophilic balance numbers (hereinafter referred to as HLB value) are understood to help determine the character of a surfactant. Originating from the work of Griffin in the 1950's, the HLB values are calculated according to the following formula: HLB=20*Mh/M, where Mh is the molecular mass of the hydrophilic portion of the surfactant molecule and M represents the total mass of the surfactant.

As mentioned the XL C-chain is a branched C10, which was the only this type tested as it is readily commercially available. But different types are possible (longer or shorter). As will be understood by the person skilled in the art, the Guerbet alcohol describes only the name reaction how to synthesize a branched hydrocarbon. It is understood that different types are available. The branched C-chain is preferable to achieve a better oil emulsification and better wettability of hydrophobic surfaces, compared to a straight C-chain.

According to a preferred embodiment of the present invention, the surfactants are selected form the group of non-ionic surfactants. Preferably, the surfactants are ethyleneoxides (also referred to as alcohol ethoxylates. More preferably, the surfactant being ethoxylate alcohols have a chain length of at least 6 carbon atoms. More preferably, the ethoxylate alcohols have a chain length of at least 8 carbon atoms. More preferably, the ethoxylate alcohols have a chain length of at least 6 carbon atoms with a minimum degree of ethoxylation of 9 or higher.

Preferably also, the surfactant are selected based on their HLB value, which, as mentioned above with respect to non-ionic surfactants, can be easily calculated. The inventors have noted that it is desirable to have a fairly high HLB value, preferably of 13 or higher at the high pH of the barium sulfate scale dissolver. It is believed that the reason for this is that the hydrate layer around the ethoxylate chain form differently depending on the pH which leads to a less hydrophilic character of the ethoxylate chain at a higher pH. It is therefore thought to be preferable to have a surfactant with a longer chain in order to achieve a sufficient solubilisation at a pH of 10 or higher.

Absolute Solubility of Barium Sulfate Scale

The inventors have previously noted that chelating agents such as EDTA (Ethylenediaminetetraacetic acid) or DTPA (diethylenetriamine, pentaacetic acid) have the ability to dissolve non-contaminated barium sulfate depends substantially on the size and ion strength of the counterion.

In Tables 3 and 4 (absolute solubility testing) the absolute (or maximum) solubility of non-contaminated barium sulfate increases with the size of the counterion from lithium to cesium. TEAH (Tetraethylammonium hydroxide) and TBAH (Tetrabuthylammonium hydroxide) as organic bases (counterions) are showing the same trend. Information indicates that the size of the TBAH cation (including the hydrate layer) is comparable to potassium.

The solubility numbers for both were found to be very similar. In order to quantitatively compare the kg/solubility properly, the $BaSO_4$:chelating agent ratio was calculated in g/mol and the $Ba^{2+}$:chelating agent ratio was calculated in mol/mol. The mol:mol ratio indicates the number of molecules of the chelating agent needed to dissolve one ion of $Ba^{2+}$ (complex). The highest ratio which was found was almost 0.5, which means that there needs to be, on average, 2 molecules of DTPA to dissolve 1 $Ba^{2+}$ ion but mostly it can be much less.

Tests performed have indicated that besides the nature of the counterion, an excess of the counterion also improves the solubility. $K_5DTPA$ was tested in conjunction with KCl, $K_2CO_3$, and KOOCH (potassium formate). It seems that the counterion also plays a large role as $K_2CO_3$ (with the larger anion) was much more effective than KCl (with a small anion).

TABLE 3

Absolute solubility of non-contaminated barium sulfate scale (when using a 40% solution of the scale removing composition)

| | pH | 40 wt % sol $BaSO_4$ (kg/m3) | $BaSO_4$ (g/mol) | $Ba^{2+}$ (mol/mol) |
|---|---|---|---|---|
| $Li_5DTPA$ | | 2 | | |
| $Na_5DTPA$ | 13.01 | 17 | 20.24 | 0.088 |
| $K_5DTPA$ | 13.25 | 46 | 62.16 | 0.266 |
| $K_5DTPA$ + 10 wt % $K_2CO_3$ | 13.21 | 38 | 51.35 | 0.22 |
| $Cs_5DTPA$ | 13.4 | 52 | 72.2 | 0.309 |
| $Na_4EDTA$ | 13.11 | 9 | 7.89 | 0.034 |
| $K_4EDTA$ | 13.32 | 31 | 32.98 | 0.141 |
| $TEAH_4DTPA$ | 13.1 | 14 | 43.75 | 0.187 |
| $TBAH_5DTPA$ | 13.33 | 18 | 64.28 | 0.275 |

TABLE 4

Absolute solubility of non-contaminated barium sulfate scale (when using a 20% solution of the scale removing composition) at 60° C.

| | pH | 20 wt % sol BaSO4 (kg/m3) | BaSO4 (g/mol) | $Ba^{2+}$ (mol/mol) |
|---|---|---|---|---|
| $K_5DTPA$ | 13.19 | 27 | 72.97 | 0.313 |
| $K_5DTPA$ + 5 wt % $K_2CO_3$ | 13.32 | 41 | 110.81 | 0.475 |
| $K_5DTPA$ + 5 wt % $K_2CO_3$ | 11.25 | 40 | 108.11 | 0.463 |
| $K_5DTPA$ + 5 wt % $K_2CO_3$ | 10 | 33 | 89.19 | 0.3821 |
| Cs5DTPA + 5 wt % CsCO3 | | 35 | | |
| Cs5DTPA + 10 wt % $CsCO_3$ | | 35 | | |
| Cs5DTPA + 10 wt % HCOOCs | | 30 | | |
| TEAH4DTPA + 10 wt % $K_2CO_3$ | | 21 | | |
| TBAH5DTPA + 10 wt % $K_2CO_3$ | | 25 | | |

Moreover, the $K_5DTPA$ composition (at 40%) was determined to dissolve 30 kg/m³ of FeS for a g/mol total of 40.54.

Preferably, the dissolution of non-contaminated barium sulfate in an amount above 20 kg/m³. More preferably, dissolution of barium sulfate above 30 kg/m³ is desired.

Speed of Barium Scale Dissolution

A second set of tests were performed to study the speed of dissolution of non-contaminated barium sulfate scale. In order to determine the speed, a relatively small amount of $BaSO_4$ (0.25 g—this equates to 10 kg/m³) was used and the time was measured until the solution became clear. Large differences were noted. The best results involved the combination of $K_5DTPA$ with $K_2CO_3$. This combination provided a dissolution time which was almost 4 times faster than $K_5DTPA$ alone.

The speed of dissolution of compositions according to preferred embodiment of the present invention were tested and studied. Table 5 summarizes the findings of the testing. The experiment involved the dissolution of 0.25 g of $BaSO_4$ in a volume of 50 ml fluid at 60° C. under gentle stirring by magnetic stir bar.

TABLE 5

Speed of dissolution of non-contaminated barium sulfate scale

| Fluid | Time | pH |
|---|---|---|
| $K_5DTPA$ (40%) | 1 h 44 min | 13.26 |
| $K_5DTPA$ (40%) + 10% TBAH | 1 h 38 min | 13.4 |
| $K_5DTPA$ (40%) + 20% TBAH | 1 h 21 min | 13.43 |
| $K_5DTPA$ (40%) + 30% TBAH | 1 h 20 min | 13.49 |
| $K_5DTPA$ (40%) + 10 wt % KCl | 1 h 24 min | 13.27 |
| $K_5DTPA$ (40%) + 10% $K_2CO_3$ | 30 min | 13.22 |
| $K_5DTPA$ (20%) + 5% $K_2CO_3$ | 22-23 min | 10.5-11 |

This testing indicates that both the extent of barium scale dissolution and the speed at which it is dissolved represent marked improvements over known compositions.

Preferably, the scale removal enhancer is selected from the group consisting of: $K_2CO_3$; KOOCH; $CsCO_3$; CsCOOH and combinations thereof. Preferably, the scale removal enhancer is $K_2CO_3$. Preferably also, the scale removal enhancer is present in an amount ranging from 5 to 30% by weight of the scale removal composition. More preferably from 10 to 20% by weight and even more preferably, the scale removal enhancer would be present in an amount of approximately 10% by weight.

Impact of Temperature

The speed of dissolution of a barium scale dissolver composition was tested and studied under different temperature conditions on non-contaminated barium sulfate scale. Table 6 summarizes the findings of the testing. The experiment involved the dissolution of 0.25 g of $BaSO_4$ in a volume of 50 ml fluid at various temperatures under gentle stirring by magnetic stir bar. The composition tested comprised a 20 wt % solution of $K_5DTPA$ and 5 wt % $K_2CO_3$.

TABLE 6

Impact of Temperature on the Dissolution of Barium Sulfate

| Temperature in ° C. (° F.) | Time (minutes) |
|---|---|
| 25 (77) | 225 |
| 40 (104) | 50 |
| 60 (140) | 22 |
| 80 (176) | 3.5 |
| 90 (194) | 1.5 |

Laboratory Testing of Scale Dissolution

The sample selected for the solubility testing origins from an oilfield tubular containing sulfate scale crystals originally used for demonstration purposes. Crystals of non-contaminated barium sulfate scale were removed from the tubular to be used for the solubility testing. 200 mL of the composition ($K_5DTPA$ 20 wt % and 5 wt % $K_2CO_3$) was used. A weighted portion of oilfield sulfate scale sample was submerged in 200 mL of each de-scaling composition. A small magnetic stirrer is added to create a very minimal vortex, creating a small movement of fluid without rigorously stirring the fluid. The fluid was heated to 70° Celsius.

Results 25.165 grams of non-contaminated oilfield sulfate scale was weighted and added to the fluid. The stirrer and heater were started. After 1 hour a slight colouring of the fluid was observed. After 4 hours at temperature when no continued visual reduction of scale was observed, the fluid was filtered and the filter rinsed with water, dried and weighted. The maximum scale solubility was reached and subsequently calculated.

The base barium scale dissolver composition (used in later testing and referred to as "base BSD") comprises a 20 wt % solution of $K_5DTPA$ and 5 wt % $K_2CO_3$. The base BSD was able to dissolve 52.97 grams per litre of scale at 70° C. The testing was also carried out with a commercially available product (Barsol NS™), which is alkali/EDTA based and with EDTA. The Barsol NS™ product was capable of dissolving 24.19 grams per litre. While EDTA alone only dissolved around 6 grams per litre. Under identical conditions, BSD-40 was shown to have more than double the performance of Barsol NS™

Extent of Dissolution of Petroleum-Contaminated Barium Scale

In order to assess the extent and efficacy of barium sulfate scale dissolvers according to preferred embodiments of the present invention, testing using petroleum-contaminated barium sulfate was carried out. The dissolution of barium sulfate contaminated with petroleum products to mimick the real-life situations encountered in the oilfield was studied by comparing a barium sulfate dissolver (the base BSD) to various preferred compositions according to the present invention (base BSD with XL 90, base BSD with XL 100, and base BSD with XL 140).

The preparation of contaminated petroleum involved the following: use 10 g of lab grade 98% pure Barium Sulfate and add to that 3 g of a low viscous crude oil into a beaker. The ingredients were mixed with a stir rod until a homogenous, dry, powdered mixture was achieved. The mixture were allowed to sit for 24 hours.

The amount of liquid used was 100 ml to which was added 0.25 g of contaminated $BaSO_4$. Therefore, the 1500 mg/L Ba below is just the maximum of available Ba under these experimental conditions and not a maximum for the barium sulfate scale dissolver. This experiment shows that the solubility is improved and the oil layer can be successfully removed, it was not designed as a measure of the extent of dissolution of barium sulfate scale by the barium scale dissolver with surfactant.

The results of the analysis of the solution was done by atomic spectroscopy which analyzed the amount of barium dissolved in the solution are listed in Table 7 below.

TABLE 7

Elemental analysis of dissolved barium by Atomic Spectroscopy

| Lab Filtered Elements | UNITS | Base BSD | Base BSD with XL 90 | Base BSD with XL 100 | Base BSD with XL 140 |
|---|---|---|---|---|---|
| Dissolved Barium (Ba) | mg/L | 1100 (1) | 1500 (1) | 1500 (1) | 1500 (1) |

RDL=Reportable Detection Limit (1) Detection limits raised due to dilution to bring analyte within the calibrated range.

Moreover, the compositions according to the present invention used are quite environmentally safe. This represents a major advantage over any known chemically-based methods of the removal of petroleum-contaminated barium scale. Another advantage to the compositions according to preferred embodiments of the present invention includes the speed of dissolution which is considerably faster than any known commercial compositions. Another advantage of preferred compositions according to the present invention is that they can be employed on wells according to a one-step process and thus are very desirable to operators which deal with petroleum-contaminated barium sulfate scale issues.

According to a preferred embodiment of the present invention, there is provided a one—step process for removing petroleum-contaminated barium sulfate scale inside a wellbore, said process comprising:

providing a liquid composition comprising:
a chelating agent selected from the group consisting of: $Li_5DTPA$; $Na_5DTPA$; $K_5DTPA$; $Cs_5DTPA$; $Na_4EDTA$; $K_4EDTA$; $TEAH_4DTPA$; and $TBAH_5DTPA$;
a scale removal enhancer;
a non-ionic surfactant;

exposing a surface contaminated with petroleum-contaminated barium sulfate scale to the liquid composition;

allowing sufficient time of exposure to remove some or all of the petroleum-contaminated barium sulfate scale from the contaminated surface. The person skilled in the art will understand that what is meant by "one-step" is that there is a single treatment step in the process (or method) to remove barium sulfate scale.

When the surface contaminated with barium sulfate scale is deep underground or a hard to access tubing or piping, the exposure consists of circulating the liquid composition through the tubing or piping until it has been established that the scale has been removed beyond a desirable predetermined point. Hence, in some cases, it is quite possible that the entirety of the scale present is not removed but the amount of removal is sufficient to re-start operations and provide the desired productivity and/or circulation through the affected tubing/piping. The liquid composition can also be heated in order to improve the removal of the scale and the speed at which the removal is effected.

According to another preferred embodiment of the present invention, the method of treatment of petroleum-contaminated $BaSO_4$ scale wherein the fluid is spotted, i.e. placed in a tube/tank/pipe/equipment in a soaking operation. This may in some instances be somewhat less efficient than circulating the fluid due to the surface reaction nature of the fluid, but it is used in some cases to remove enough scale to run tools, for example.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous composition for use in removing petroleum-contaminated barium sulfate scale from a surface contaminated with such, said composition consisting of:
a chelating agent having chelating agent components, said chelating agent components including Ethylenediaminetetraacetic acid (EDTA), diethylenetriaminepentaacetic acid (DTPA), Tetraethylammonium hydroxide (TEAR), and Tetrabutylammonium hydroxide (TBAH) said chelating agent and a counterion component selected from the group consisting of: $Na_5DTPA$; $K_5DTPA$; $Cs_5DTPA$; $Na_4EDTA$; $K_4EDTA$; $TEAH_4DTPA$; and $TBAH_5DTPA$;

a scale removal enhancer;
a non-ionic surfactant;
distilled water;
potassium hydroxide; and
wherein the non-ionic surfactant is a linear alcohol ethoxylate surfactant having a chain length of at least 6 carbon atoms and wherein said aqueous composition has a pH ranging from 10 to 11.

2. The aqueous composition according to claim 1, wherein the scale removal enhancer is selected from the group consisting of: potassium carbonate; potassium formate; cesium formate and cesium carbonate and combinations thereof.

3. The aqueous composition according to claim 1 where the non-ionic surfactant is a linear alcohol ethoxylate surfactant selected from the group consisting of: alcohol ethoxylate surfactants having a chain length of at least 8 carbon atoms.

4. The aqueous composition according to claim 1 where the non-ionic surfactant is an alcohol ethoxylate surfactant selected from the group consisting of: alcohol ethoxylate surfactants having a minimum degree of ethoxylation of 9 or higher.

5. The aqueous composition according to claim 1 where the non-ionic surfactant is an alcohol ethoxylate surfactant selected from the group consisting of: alcohol ethoxylate surfactants having a HLB value of 13 or higher.

6. The aqueous composition according to claim 1, wherein the scale removal enhancer is present in the composition in an amount ranging from 5 to 20 wt % of the composition.

7. The aqueous composition according to claim 1, wherein the scale removal enhancer is present in the composition in an amount ranging from 10 to 15 wt % of the composition.

8. The aqueous composition according to claim 1, wherein the scale removal enhancer is present in the composition in an amount of approximately 10 wt % of the composition.

9. The aqueous composition according to claim 1, wherein the chelating agent and counterion are present in the composition in an amount ranging from 5 to 40 wt % of the composition.

10. The aqueous composition according to claim 1, wherein the chelating agent and counterion are present in the composition in an amount ranging from 10 to 30 wt % of the composition.

11. The aqueous composition according to claim 1, wherein the chelating agent and counterion are present in the composition in an amount ranging from 10 to 20 wt % of the composition.

12. The aqueous composition according to claim 1, wherein the scale removal enhancer is selected from the group consisting of: $K_2CO_3$; KOOCH; $CsCO_3$; CsCOOH.

* * * * *

UNITED STATES PATENT AND TRADEMARK OFFICE
CERTIFICATE OF CORRECTION

PATENT NO. : 11,945,997 B2
APPLICATION NO. : 16/823025
DATED : April 2, 2024
INVENTOR(S) : Clay Purdy et al.

It is certified that error appears in the above-identified patent and that said Letters Patent is hereby corrected as shown below:

In the Claims

Column 12, Line 63, Claim 1:
The term "Tetraethylammonium hydroxide (TEAR)" should be corrected as "Tetraethylammonium hydroxide (TEAH)".

Signed and Sealed this
Sixteenth Day of July, 2024

Katherine Kelly Vidal
*Director of the United States Patent and Trademark Office*